(12) United States Patent
Chen (10) Patent No.: US 6,827,908 B1
(45) Date of Patent: Dec. 7, 2004

(54) STANDPIPE INLET FOR ENHANCING PARTICULATE SOLIDS CIRCULATION FOR PETROCHEMICAL AND OTHER PROCESSES

(75) Inventor: Ye-Mon Chen, Sugar Land, TX (US)

(73) Assignee: Shell Oil Company, Houston, TX (US)

( * ) Notice: Subject to any disclaimer, the term of this patent is extended or adjusted under 35 U.S.C. 154(b) by 679 days.

(21) Appl. No.: 09/614,978

(22) Filed: Jul. 12, 2000

Related U.S. Application Data (63) Continuation-in-part of application No. 09/253,859, filed on Feb. 22, 1999, now Pat. No. 6,228,328.

(51) Int. Cl.[7] .............................. B01J 8/18; B01J 38/30; C10G 47/30
(52) U.S. Cl. ....................... 422/145; 422/139; 422/140; 422/141; 422/142; 422/144; 502/20; 502/41; 502/45; 208/106; 208/113
(58) Field of Search ................................. 422/139, 140, 422/141, 142, 143, 144, 145; 208/106, 113; 502/20, 22, 34, 41, 45

(56) References Cited

U.S. PATENT DOCUMENTS

| | | | |
|---|---|---|---|
| 2,530,243 A | 11/1950 | Holder | 260/449.6 |
| 2,581,134 A | 1/1952 | Odell | 183/4.2 |
| 2,741,546 A | 4/1956 | Sweeney et al. | 23/288 |

(List continued on next page.)

FOREIGN PATENT DOCUMENTS

| | | |
|---|---|---|
| DE | 3133357 | 3/1983 |
| EP | 197486 | 10/1986 |
| EP | 457540 | 11/1991 |
| EP | 1016444 | 7/2000 |
| WO | 93/01257 | 1/1993 |
| WO | 9604353 A1 | 2/1996 ........... C01G/35/14 |

OTHER PUBLICATIONS

L. Nogier et al., "FCC Stripper Design Considerations," paper presented at Second FCC Forum, May. 15–17, 1996, The Wooldlands, Texas, 2 pages.
G. K. Khoe et al., "Rheological and Fluidization Behavior of Powders of Different Particle Size Distribution," *Powder Technology*, 66 (1991) 127–141.
Robert A. Meyers, Editor in Chief, *Handbook of Petroleum Refining Processes*, Second Edition, McGra-Hill. Date is more than one year prior to filing date. pp. 3.4–3.7, no publication date.
International Search Report dated May 17, 2000 of PCT/EP00/01355.
PCT Search Report dated Jun. 2, 2002 of PCT/EP01/07939.

*Primary Examiner*—Alexa Doroshenk (57) ABSTRACT

In a fluid catalytic cracking (FCC) unit, a regenerator, a stripper or a withdrawal well connecting to either of the vessels, includes a standpipe for circulating catalyst from one vessel to another, the standpipe having an inlet design which reduces gas entrainment during catalyst transport by partial de-fluidization in the standpipe inlet region. The standpipe inlet design could include multiple inlet openings through the top of the standpipe or from the side wall by slots, or both, and a horizontal disk surrounding the standpipe below the slots for blocking the upward flow of bubbles, the combination thereby forming a dense fluidization zone above the disk and surrounding the inlet, including the slots. Additionally, the disk may include a downwardly-projecting lip or edge forming an inverted void space around the standpipe and the downwardly-projecting edge may further include vent holes around its circumference which allow bubbles trapped under the disk to be vented outside the standpipe inlet region. Above and below the disk and surrounding the standpipe, gas injection rings may be used to prevent the dense fluidization zone above the disk from complete de-fluidization, thus assisting the catalyst to remain fluidized and flow smoothly into the standpipe either through the slots or at the very top of the open standpipe, or both.

18 Claims, 6 Drawing Sheets

U.S. PATENT DOCUMENTS

| | | | |
|---|---|---|---|
| 2,769,771 A | 11/1956 | Griffin, Jr. ............... 196/52 |
| 2,893,851 A | 7/1959 | Georgian .................. 23/288 |
| 2,944,009 A | 7/1960 | Huntley et al. ........... 208/155 |
| 3,031,769 A | 5/1962 | Wilson ....................... 34/57 |
| 3,099,538 A | 7/1963 | Kronig et al. |
| 3,394,076 A | 7/1968 | Bunn, Jr. et al. ......... 502/41 |
| 3,494,858 A | * 2/1970 | Luckenbach ............ 208/164 |
| 3,607,730 A | 9/1971 | Pfeiffer .................... 208/164 |
| 3,775,302 A | 11/1973 | Kubo et al. ............... 208/157 |
| 4,060,395 A | * 11/1977 | Castagnos et al. ....... 422/144 |
| 4,329,526 A | 5/1982 | Bagley et al. ............ 570/203 |
| 4,511,434 A | 4/1985 | Vasalos ..................... 202/99 |
| 5,110,323 A | 5/1992 | Soni |
| 5,529,587 A | 6/1996 | Diver ........................ 44/625 |
| 5,562,818 A | 10/1996 | Hedrick ................... 208/163 |
| 5,779,746 A | 7/1998 | Buchanan et al. ......... 55/452 |

* cited by examiner

STANDPIPE INLET FOR ENHANCING PARTICULATE SOLIDS CIRCULATION FOR PETROCHEMICAL AND OTHER PROCESSES

REFERENCE TO RELATED APPLICATIONS

This is a continuation-in-part of application Ser. No. 09/253,859 filed Feb. 22, 1999, now U.S. Pat. No. 6,228,328.

BACKGROUND OF THE INVENTION

1. Field of the Invention

The invention relates to a standpipe inlet design for enhancing particle circulation and reducing gas entrainment, the design being suitable for applications in fluid catalytic cracking (FCC) units and other processes, such as fluid cokers, flexicokers, and fluidized bed combustors which circulate large quantities of particulate solids between different vessels connected with standpipes and risers.

2. Description of the Related Art

In a typical Fluid Catalytic Cracking (FCC) process consisting of a regenerator, a riser reactor and a stripper, such as that shown in U.S. Pat. No. 5,562,818 to Hedrick which is incorporated herein by reference, finely divided regenerated catalyst leaves a regenerator and contacts with a hydrocarbon feedstock in a lower portion of a reactor riser. Hydrocarbon feedstock and steam enter the riser through feed nozzles. The mixture of feed, steam and regenerated catalyst, which has a temperature of from about 200° C. to about 700° C., passes up through the riser reactor, converting the feed into lighter products while a coke layer deposits on catalyst surface. The hydrocarbon vapors and catalyst from the top of the riser are then passed through cyclones to separate spent catalyst from the hydrocarbon vapor product stream. The spent catalyst enters the stripper where steam is introduced to remove hydrocarbon products from the catalyst. The spent catalyst containing coke then passes through a stripper standpipe to enter the regenerator where, in the presence of air and at a temperature of from about 620° C. to about 760° C., combustion of the coke layer produces regenerated catalyst and flue gas. The flue gas is separated from entrained catalyst in the upper region of the regenerator by cyclones and the regenerated catalyst is returned to the regenerator fluidized bed. The regenerated catalyst is then drawn from the regenerator fluidized bed through the regenerator standpipe and, in repetition of the previously mentioned cycle, contacts the feedstock in the reaction zone.

Catalyst circulation is critical to overall performance and reliability of FCC units. The main drive for catalyst circulation comes from stable and adequate pressure build-up in the standpipe. One critical element of the standpipe design is the inlet design because it determines the inlet condition of the catalyst which, in turn, affects the entire standpipe operation.

The prior art of standpipe inlet design, for both stripper standpipe and regenerator standpipe, is a conical hopper such as that shown in "Handbook of Petroleum Refining Process", second edition by R. A. Meyers, which is incorporated herein by reference. The key concept of the inlet hopper design of the prior art is that when catalyst particles are drawn from a fluidized bed into a standpipe, bubbles are also drawn together with the catalyst. The inlet hopper provides residence time for the bubbles to coalesce and grow into large bubbles before entering the standpipe. Since large bubbles have a higher riser velocity, they have a better chance to escape back into the fluidized bed, thus reducing gas entrainment into the standpipe.

However, the design concept of the prior art standpipe inlet has several disadvantages. If the inlet hopper is too small, many bubbles drawn into the inlet hopper do not have enough time to grow but flow directly into the standpipe, leading to high gas entrainment. If, on the other hand, when the inlet hopper is large enough to allow small bubbles to grow, large bubbles could form and hang stationary inside the hopper for a period of time as the bubbles try to rise against the downward catalyst flow. These large hanging bubbles can temporarily restrict catalyst flow into the standpipe. When the bubbles finally grow large enough to escape into the fluidized bed, the release of the large bubbles creates a sudden surge of catalyst into the standpipe, leading to a sudden pressure swing in the standpipe. The sequence of growing and releasing of large bubbles leads to a very undesirable condition of unstable standpipe operation. The fundamental flaw of the prior art design is that, while the objective of the standpipe inlet design is supposed to reduce gas entrainment into the standpipe, the design in fact encourages many bubbles to be drawn in. This is inherently very inefficient. Furthermore, the prior art of the inlet hopper design is a bulky structure such that in many FCC units there is not enough room to place it. A common compromise is to use either a straight pipe or an asymmetric hopper for the standpipe inlet which further exacerbates the problems described above.

Standpipe inlet geometry not only affects catalyst circulation, the entrained gas can also have a negative impact on the performance of a stripper of a FCC unit. It is common practice that the stripper includes special trays, such as shown in the invention by Johnson et al in international patent PCT/US95/09335 which is incorporated herein by reference. The special trays in the main vessel enhance the efficiency of hydrocarbon vapor stripping by steam. The spent catalyst is then transported to the regenerator through a stripper standpipe with a hopper inlet as shown in the prior art. The hopper inlet for the stripper standpipe has been shown to be rather ineffective in reducing gas entrainment. The study of Nougier et al in the Second FCC Forum (May 15–17, 1996, The Woodlands, Tex.) shows that, even after intensive stripping in the main vessel, the vapor leaving the stripper still contains 20 to 25% by mole (or about 40% by weight) of hydrocarbon products. Gas entrainment from the stripper standpipe into the regenerator has two negative impacts in addition to the impact on catalyst circulation discussed above. First, the entrained gas from the stripper to the regenerator represents a loss in hydrocarbon products which could have been recovered as products. Second, the entrained hydrocarbon has to be burned in the regenerator which consumes limited air available in the regenerator and generates additional heat that has to be removed. Thus, it is essential to reduce gas entrainment into the stripper standpipe.

One configuration of recent prior art, "Fluid Catalytic Cracking Technology and Operation" by Joseph W. Wilson, tries to address the standpipe inlet issue with a design different from the conventional inlet hopper in a large fluidized bed vessel. As will be discussed below with reference to FIG. 5, this particular configuration includes a withdrawal well, which is a much smaller fluidized bed vessel, connected to the main regenerator vessel via an inclined duct. The regenerator standpipe is then connected to the bottom of the withdrawal well not having a conventional inlet hopper.

One objective of the instant invention is to reduce gas entrainment into standpipes by a standpipe inlet design. This will lead to increases in overall pressure build-up in the standpipe and catalyst circulation rate as well as improving standpipe stability. The reduction in gas entrainment will also reduce hydrocarbon entrainment from the stripper to the regenerator of a FCC unit, as discussed above. Another objective of the instant invention is to improve catalyst circulation of the prior art of FIG. 5 with a withdrawal well having an improved standpipe inlet design.

SUMMARY OF THE INVENTION

The current invention is a new standpipe inlet design to improve stability of catalyst circulation suitable for applications in catalytic cracking units, fluid cokers and other processes involving circulation of particulate solids between vessels. In a fluid catalytic cracking (FCC) unit, a regenerator, a stripper or a withdrawal well connecting to either of the vessels, includes a standpipe for circulating catalyst from one vessel to another, the standpipe having an inlet design which reduces gas entrainment during catalyst transport by partial de-fluidization in the standpipe inlet region. The standpipe inlet design could include multiple inlet openings, e.g., through the top of the standpipe or from the side wall by means of slots, or both, and a horizontal disk surrounding the standpipe below the slots for blocking the upward flow of bubbles, the combination thereby forming a dense fluidization zone above the disk and surrounding the inlet, including the slots. Additionally, the disk may include a downward-projecting lip or edge forming an inverted void space around the standpipe and the downward-projecting edge may further include vent holes around its circumference which allow bubbles trapped under the disk to be vented outside the standpipe inlet region. Above the disk and surrounding the standpipe, gas injection rings may also be used to prevent the dense fluidization zone above the disk from complete de-fluidization, thus assisting the catalyst to remain fluidized and flow smoothly into the standpipe, either through the slots or at the very top of the open standpipe, or both. The disk itself may also include vent holes for preventing complete de-fluidization. Similar design concepts can be applied to a standpipe connecting to the bottom of a main vessel, such as a regenerator or a stripper, or to the bottom of a withdrawal well connecting to the main vessel.

DESCRIPTION OF THE PREFERRED EMBODIMENTS

The main drive for catalyst circulation in FCC units comes from stable and adequate pressure build-up in the standpipe. One critical element of the standpipe design is the inlet design because it determines the inlet condition of the catalyst which, in turn, affects the entire standpipe operation. It is essential to reduce gas entrainment by a properly designed standpipe inlet.

The key concept of the instant invention of the standpipe inlet design is totally different from the inlet hopper design of the prior art, which has many disadvantages as discussed previously. The design concept of the instant invention relies on partial de-fluidization, rather than bubble coalescence and growth inside the hopper, to reduce gas entrainment which is discussed in detail below.

The reason that FCC catalyst can be maintained at the fluidization state in the regenerator or the stripper is by a continuous supply of upflowing, fluidizing gas. Thus, as soon as the supply of the fluidizing gas is cut off, the fluidized catalyst starts to settle, or de-fluidize, immediately. In the initial stage of this de-fluidization process, bubbles escape very quickly from the fluidized bed, as shown by Khoe et al in Powder Technology Vol. 66 (1991) which is incorporated herein by reference. After the depletion of all bubbles, FCC catalyst can still be maintained at a dense fluidization state for a certain period of time before becoming completely de-fluidized, as also shown by Khoe et al. In Khoe et al's experiments, the de-fluidization process was triggered by shutting off fluidization gas supply, leading to de-fluidization of the entire fluidized bed. However, one could trigger a local de-fluidization process within a fluidized bed by strategically blocking off the upflowing, fluidizing gas in a selective area. The instant invention of standpipe inlet design utilizes this special characteristic of FCC catalyst by partial de-fluidization in a strategic area to eliminate the bubbles and by allowing only densely fluidized catalyst to flow into the standpipe.

Figure 1:
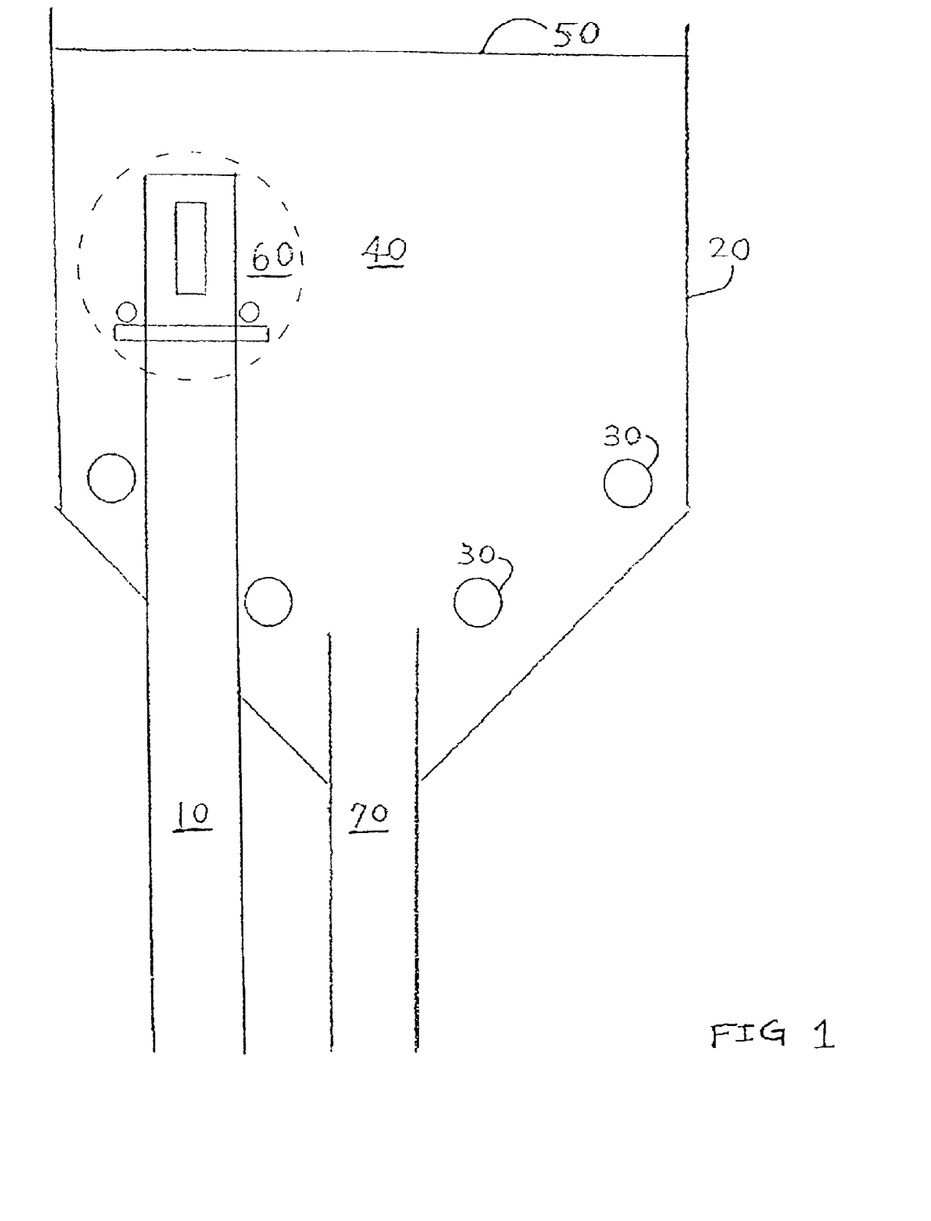
FIG. 1 is a sectional view of the lower portion of a regenerator of a FCC unit including a regenerator standpipe.

FIG. 1 shows a sectional view of the lower portion of a typical regenerator 20 of a FCC unit having a regenerator standpipe 10 which includes an inlet portion 60 to draw in regenerated catalyst according to the instant invention. Spent catalyst is transported from a stripper (not shown) through a typical spent catalyst transport duct 70 and enters the regenerator 20 where coke deposition on catalyst is burned off by air which is supplied by main air grid 30. The air from grid 30 and the resulting combustion gas rise through the regenerator, thus keeping the catalyst fluidized in fluidized bed 40. The combustion gas and entrained regenerated catalyst are separated in the upper part of the regenerator by cyclones (not shown). The combustion gas exits from the upper part of the regenerator and the regenerated catalyst, separated by cyclones (not shown), is returned to the fluidized bed 40. Typical density of the fluidized bed 40 in regenerator 20 is in the range of 20 to 40 lb/ft$^3$, with the presence of many rising gas bubbles. The density of the fluidized bed 40 is controlled mainly by the air flow from air grid 30 where higher fluidizing air flow leads to more gas bubbles and lower density of fluidized bed 40. The fluidized bed 40 is maintained at a certain level 50 by a slide valve (not shown), or other means, located at the bottom of the regenerator standpipe 10 to control the rate of regenerated catalyst being drawn into regenerator standpipe 10. The top of the regenerator standpipe 10, including a standpipe inlet 60 according to the instant invention, is shown as enclosed by the dotted circle, is completely submerged in the fluidized bed 40 inside regenerator 20. Although the standpipe 10 is shown in FIG. 1 to be vertical and protruding into regenerator 20 from the bottom, the instant invention of the standpipe inlet 60 can be applied to other configurations where the standpipe 10 might protrude into regenerator 20 through the side wall, instead of the bottom, and it might be inclined, instead of vertical.

Figure 2:
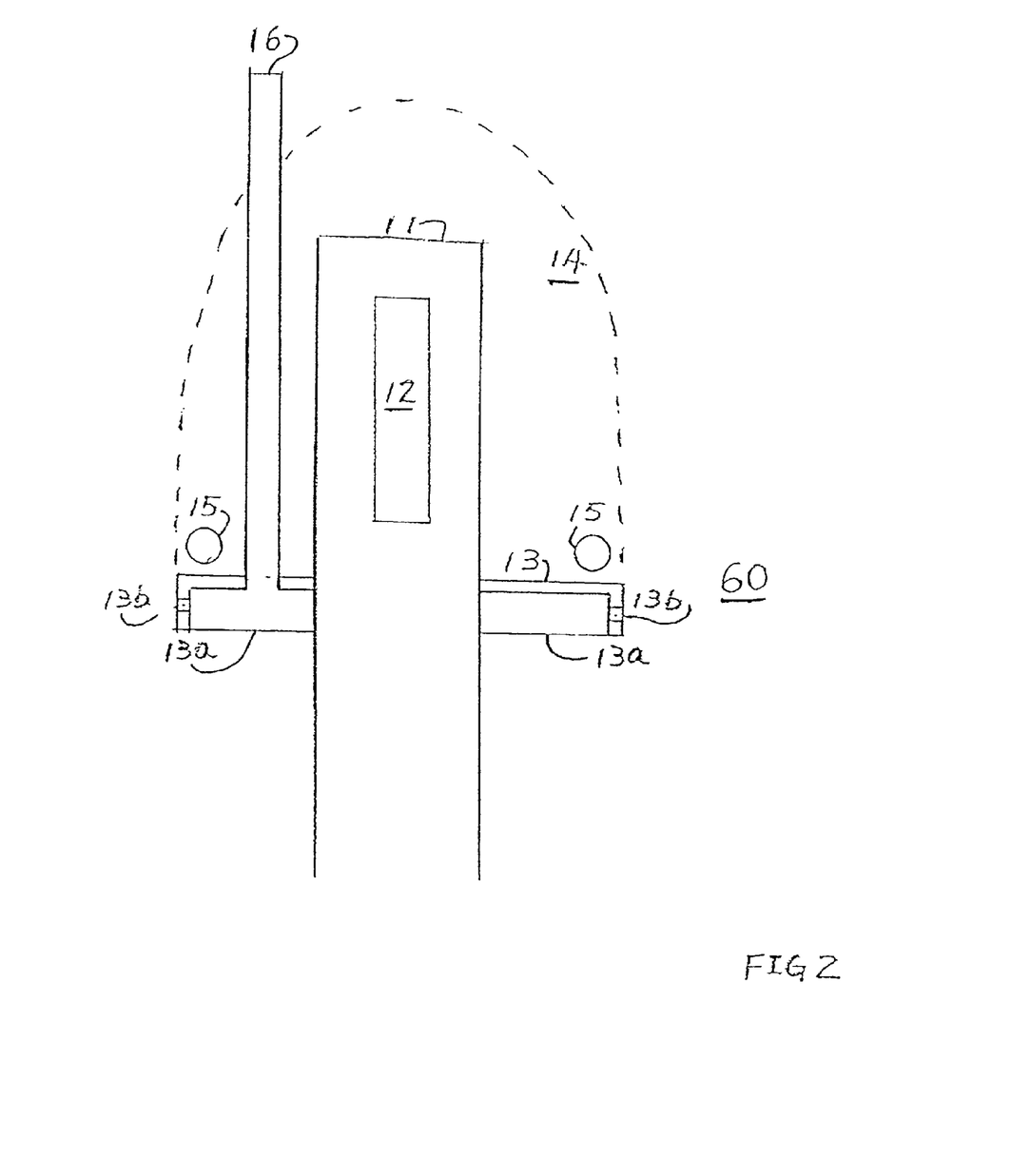
FIG. 2 is an enlarged sectional view of a portion of FIG. 1 of the regenerator standpipe inlet.

Referring now to FIG. 2 for the details of standpipe inlet 60 in FIG. 1, the regenerator standpipe 10 is typically a cylindrical duct with a diameter in the range of about 1 to about 5 feet. Regenerated catalyst is drawn into the standpipe 10 through one of two types of openings, or both, according to the instant invention. The first is the top opening 11 of the standpipe and the second is a plurality of openings 12 cut through the walls of the upper portion of the standpipe 10. Although slots are shown in FIG. 2 for openings 12, other forms, such as circular holes, could also be used. Below the openings 11 and 12 is a horizontal disk 13 surrounding the standpipe 10. In the following discussion, the element 13 will be referred to as a "disk", which is the most logical form for a cylindrically-shaped vessel. It will be appreciated, however, that the element 13 may simply be a plate of any desired shape. Since the entire standpipe inlet is submerged in the fluidized bed 40 where catalyst is fluidized by the continuous upflow of fluidizing gas from air grid 30 (see FIG. 1), disk 13 strategically blocks off the supply of the fluidizing gas coming from below and triggers the local de-fluidization process in the region directly above disk 13. As fully fluidized regenerated catalyst together with gas bubbles are being drawn toward the standpipe openings 11 and 12, the fluidizing gas is blocked off by disk 13 (except as described below) and bubbles migrating toward standpipe openings 11 and 12 run out of the continuous supply of fluidizing gas very quickly. This creates a dense fluidized zone 14, shown enclosed by the dotted line in FIG. 2, with almost no bubble presence in the near proximity to the standpipe openings 11 and 12. This allows catalyst to partially de-fluidize by eliminating gas bubbles before entering standpipe 10, but not to the extent of complete de-fluidization where catalyst can no longer flow. To prevent complete de-fluidization in the dense fluidization zone 14 above the disk 13, a small gas flow can be supplied, either by vent holes 13c in the disk 13 or through a gas injection ring 15 located above the disk 13. Although a gas injection ring 15 is shown in FIG. 2, other means, such as a gas injection grid, can also be used to achieve the same objective of preventing complete de-fluidization in the dense fluidization zone 14 above the disk 13. The disk 13 may include a downwardly-projecting side or lip 13a which circles the disk 13, preferably at its circumference. The void below disk 13 surrounded by lip 13a allows the disk to capture fluidizing gas coming from below. To continuously vent off the fluidizing gas, lip 13a may further include a plurality of vent holes 13b which allows fluidizing gas to be vented off outside the dense fluidization zone 14. Alternatively, a vent tube 16 may be used to discharge fluidizing gas from below the disk 13 to a location above the dense fluidization zone 14. Although a horizontal disk 13 is proposed as one means to achieve local de-fluidization in the dense fluidization zone 14 in FIG. 2, other means can be applied to achieve the same objective. One such alternative is shown in FIG. 3.

Figure 3:
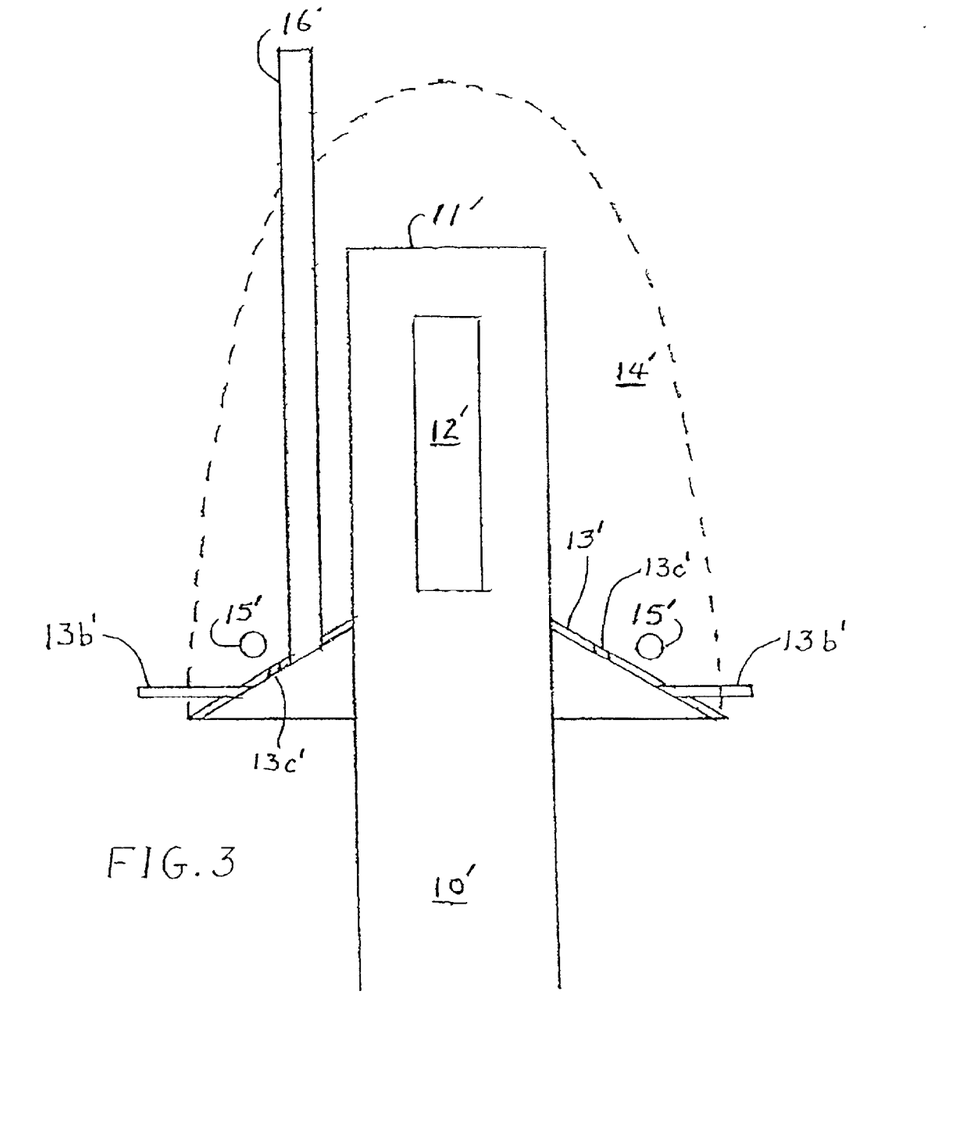
FIG. 3 is an alternative embodiment of FIG. 2 of the regenerator standpipe inlet.

Referring now to FIG. 3, regenerated catalyst is again drawn into the standpipe 10' through the top opening 11', or a plurality of openings 12', or both. Instead of using a horizontal disk 13 as in FIG. 2, FIG. 3 shows that below the openings 11' and 12' is a conical disk 13' surrounding the standpipe 10'. The function of the conical disk 13' is to strategically block off the supply of the fluidizing gas coming from below and to trigger the local de-fluidization process in the region directly above disk 13'. This creates a dense fluidized zone 14', enclosed by the dotted line in FIG. 3. To prevent complete defluidization in the dense fluidization zone 14', a small gas flow can be supplied, either by vent holes 13c' in the disk 13' or through a gas injection ring 15' located above the disk 13'. Although a gas injection ring 15' is shown in FIG. 3, other means, such as a gas injection grid, can also be used to achieve the same objective of preventing complete de-fluidization in the dense fluidization zone 14' above the disk 13'. The void below conical disk 13' allows the disk to capture fluidizing gas coming from below. To continuously vent off the accumulation of the fluidizing gas, disk 13' may further include a plurality of vent holes with extension pipes 13b' which allows fluidizing gas to be vented off outside the dense fluidization zone 14'. Alternatively, a vent tube 16' may be used to discharge fluidizing gas from below the disk 13' to a location above the dense fluidization zone 14'. One advantage of the conical disk 13' over the horizontal disk 13 in FIG. 2 is that catalyst is less likely to become stagnant when gas flow from the gas injection ring 15' is turned off.

Figure 4:
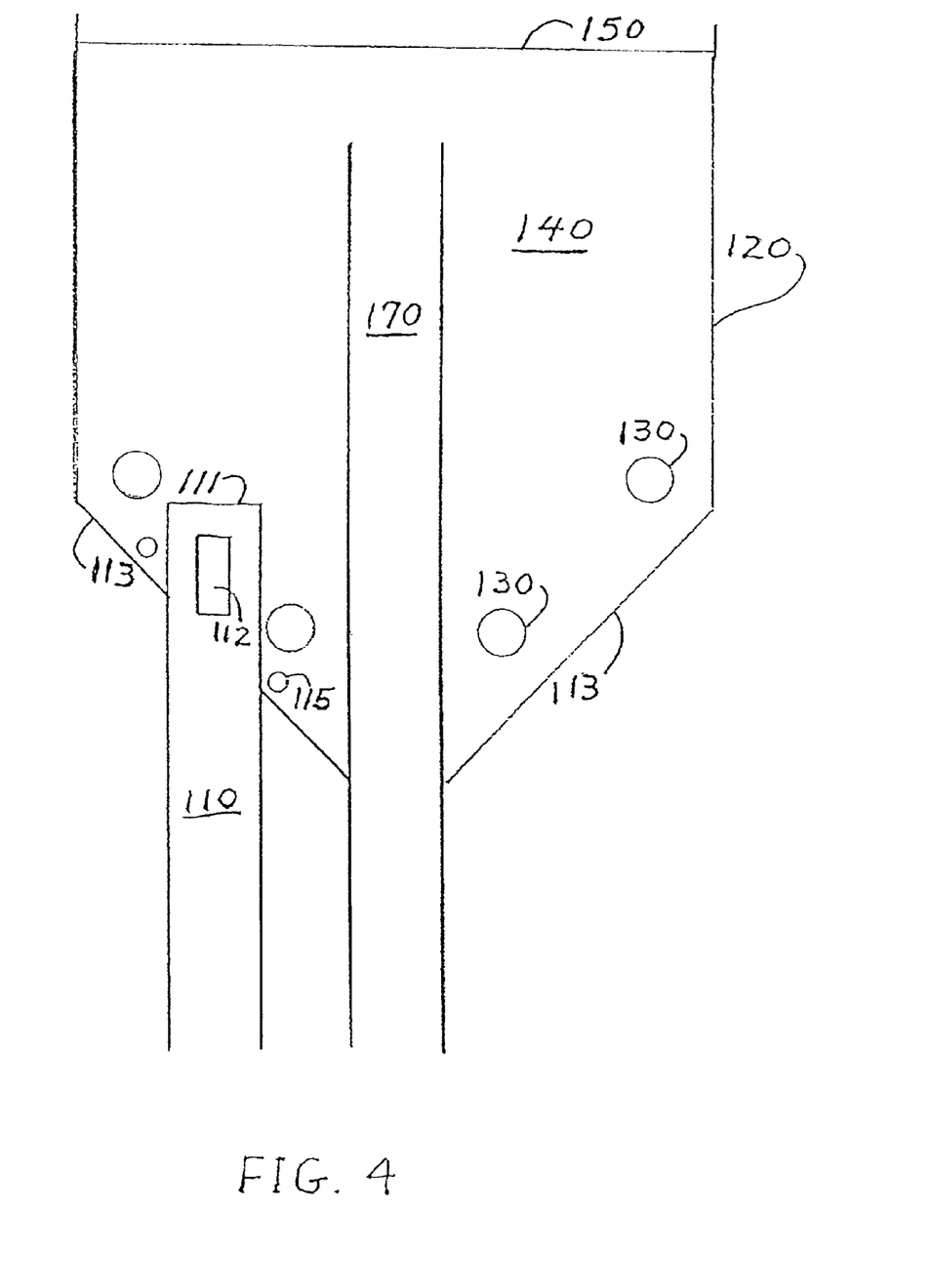
FIG. 4 is another embodiment of the regenerator standpipe inlet when catalyst is drawn from a space near the bottom wall of the regenerator vessel of a FCC unit.

FIG. 4 shows another embodiment of a regenerator standpipe inlet using a design similar to the concept of FIG. 1 except when the FCC process prefers to draw regenerated catalyst from a region very close to the bottom of regenerator 120. Spent catalyst is transported from a stripper (not shown) through a spent catalyst transport duct 170 and enters the regenerator 120. The regenerated catalyst is separated from flue gas in the upper part of the regenerator by cyclones (not shown). The flue gas exits from the upper part of the regenerator and the regenerated catalyst separated by cyclones (not shown) is returned to the lower part of the regenerator 120 to form the fluidized bed 140 by the continuous upflow of fluidizing air and combustion gas from air grid 130. The fluidized bed 140 is maintained at a level 150 by a slide valve (not shown), or other means, located at the bottom of the regenerator standpipe 110 to control the rate of regenerated catalyst being drawn into the regenerator standpipe 110. The regenerator standpipe 110 still has one of two types of inlet openings, or both, to draw catalyst from the fluidized bed 140 of the regenerator. The first opening is the top opening 111 of the standpipe 110 and the second is a plurality of openings 112 cut through the walls of the upper portion of the standpipe 110 just above the bottom vessel wall 113 of regenerator 120. Although the standpipe 110 is shown in FIG. 4 to be vertical, the instant invention of the standpipe inlet can also be applied to other configurations where the standpipe 110 might be inclined. The function of the bottom wall 113 in FIG. 4 is similar to that of the disk 13 in FIG. 2, i.e., to induce local de-fluidization and to create a dense fluidization zone 114 (as in zone 14 of FIG. 2) with almost no bubbles present in the near proximity to the standpipe openings 111 and 112. To prevent complete de-fluidization near the vessel wall, a small gas flow can be supplied through a gas injection ring 115. Although a gas injection ring 115 is shown in FIG. 4, other means, such as a gas injection grid, can also be used to achieve the same objective of preventing complete de-fluidization in the dense fluidization zone 114 above the vessel wall 113.

A regenerator standpipe inlet according to FIG. 4 was installed in one of Assignee's FCC units which originally had a hopper standpipe inlet of the prior art design. The original inlet hopper was removed and four slots measuring 6 inches wide by 40 inches long were created on the standpipe wall. After the installation of the new regenerator standpipe inlet, catalyst circulation rate of the FCC unit was increased by 30%, with an additional 3 psi pressure build-up in the regenerator standpipe. This was a clear indication that the standpipe inlet of the instant invention was very effective in reducing gas entrainment from the regenerator thus allowing the standpipe to run at higher density and to build more pressure for increasing catalyst circulation. Furthermore, the standpipe operation became more stable even at a higher catalyst circulation rate compared to previous operation.

Figure 5:
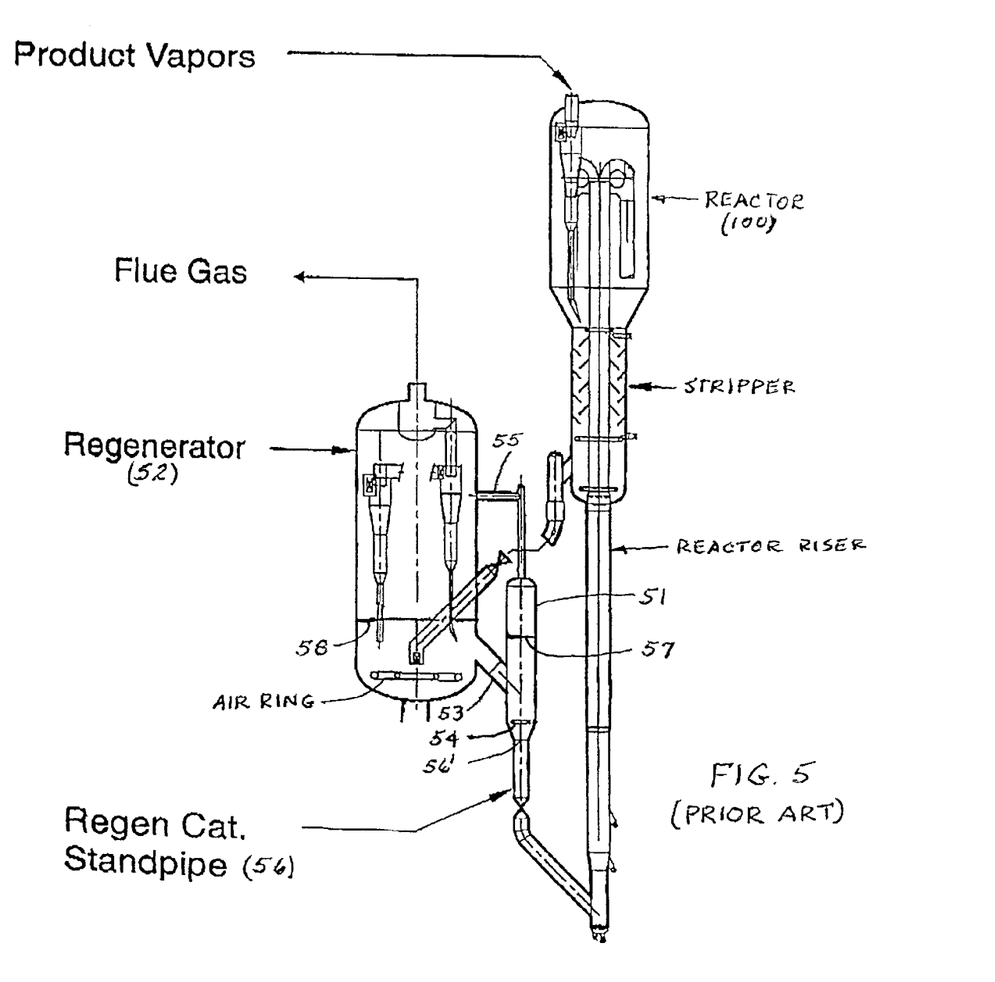
FIG. 5 shows an alternate prior art configuration using a withdrawal well.

"Fluid Catalytic Cracking Technology and Operation" by Joseph W. Wilson shows another prior art configuration which tries to address the standpipe inlet issue with a design which is different from the conventional inlet hopper located inside a large fluidized bed vessel. As shown in FIG. 5, this particular configuration includes a withdrawal well 51 located beside the regenerator 52 (analogous to regenerator 20 of FIG. 1). The withdrawal well 51 is a much smaller vessel compared to the regenerator 52. The withdrawal well 51 connects to the main regenerator 52 via an inclined standpipe 53 to allow catalyst to flow from the regenerator 52 to the withdrawal well 51. The overhead of the withdrawal well 51 is connected to the regenerator 52 via a vent line 55 to allow gas in the withdrawal well 51 to flow back to the dilute phase of the regenerator vessel above the regenerator 52 fluidized bed 58 (analogous to regenerator fluidized bed 40 of FIG. 1). The regenerator standpipe 56 (analogous to standpipe 10 of FIG. 1) is connected to the bottom of the withdrawal well 51 to allow catalyst to be transferred to the reactor 100 in the usual manner. The withdrawal well has its own fluidization injection 54 near the bottom of the withdrawal well 51 and close to the inlet 56' of regenerator standpipe 56. The fluidization injection 54 controls the fluidization condition of the withdrawal well 51 and maintains a fluidized bed level 57, which is lower than the regenerator bed level 58. The difference in elevation between the regenerator bed level 58 and the withdrawal well bed level 57 allows catalyst to flow through the inclined standpipe pipe 53.

According to the open literature, such as the paper entitled "Controlling Gas Flow in Standpipe Systems" by T. A. Gauthier and J. L. Ross presented at the 1998 Annual meeting of the AIChE, the key concept of the prior art of the withdrawal well in FIG. 5 is not to withdraw catalyst directly from the main regenerator vessel 52, which is highly fluidized with a density in the range of 20 to 40 lb/ft³ with the presence of many rising gas bubbles, because excess gas (bubbles) would enter the standpipe under such conditions when using a conventional inlet hopper. A key concept, according to Gauthier and Ross, is that catalyst flowing from the regenerator 52 into the withdrawal well 51 should be slow enough for bubbles to rise in the withdrawal well 51. The gas in the withdrawal well 51 can flow back to the regenerator 52 via vent line 55. The catalyst condition in the withdrawal well 51 is controlled independently by fluidization injection 54. Another key concept of the withdrawal well, according to Gauthier and Ross, is to reach an ideal condition for the catalyst near minimum bubbling condition when entering the standpipe 56.

However, reaching such an ideal condition for the catalyst in the withdrawal well is difficult using the prior art configuration of FIG. 5. According to T. A. Gauthier and J. L. Ross's paper, under certain conditions the withdrawal well could lead to partial de-fluidization and poor catalyst circulation. The de-fluidization is due, at least in part, to the fluidization injection 54 being located close to the standpipe 56 inlet 56'. When part of the fluidization gas emitted from fluidization injection 54 is drawn into the standpipe 56 by the catalyst circulation, the withdrawal well 51 could partially lose its fluidization, or become partially de-fluidized, which leads to catalyst circulation difficulty.

One of Assignee's FCC units originally had a withdrawal well of the prior art similar to FIG. 5. This FCC unit had experienced difficulties in maintaining stable catalyst circulation due to standpipe instability. The standpipe instability was most severe not only at high catalyst circulation rates but also at low rates. During four years, this FCC unit experienced standpipe operational problems, which led to several unit feed outages and disruptions to the entire refinery. In addition, the standpipe instability was very sensitive to the change of the regenerator bed level, which severely restricted the flexibility of the FCC operation.

Figure 6:
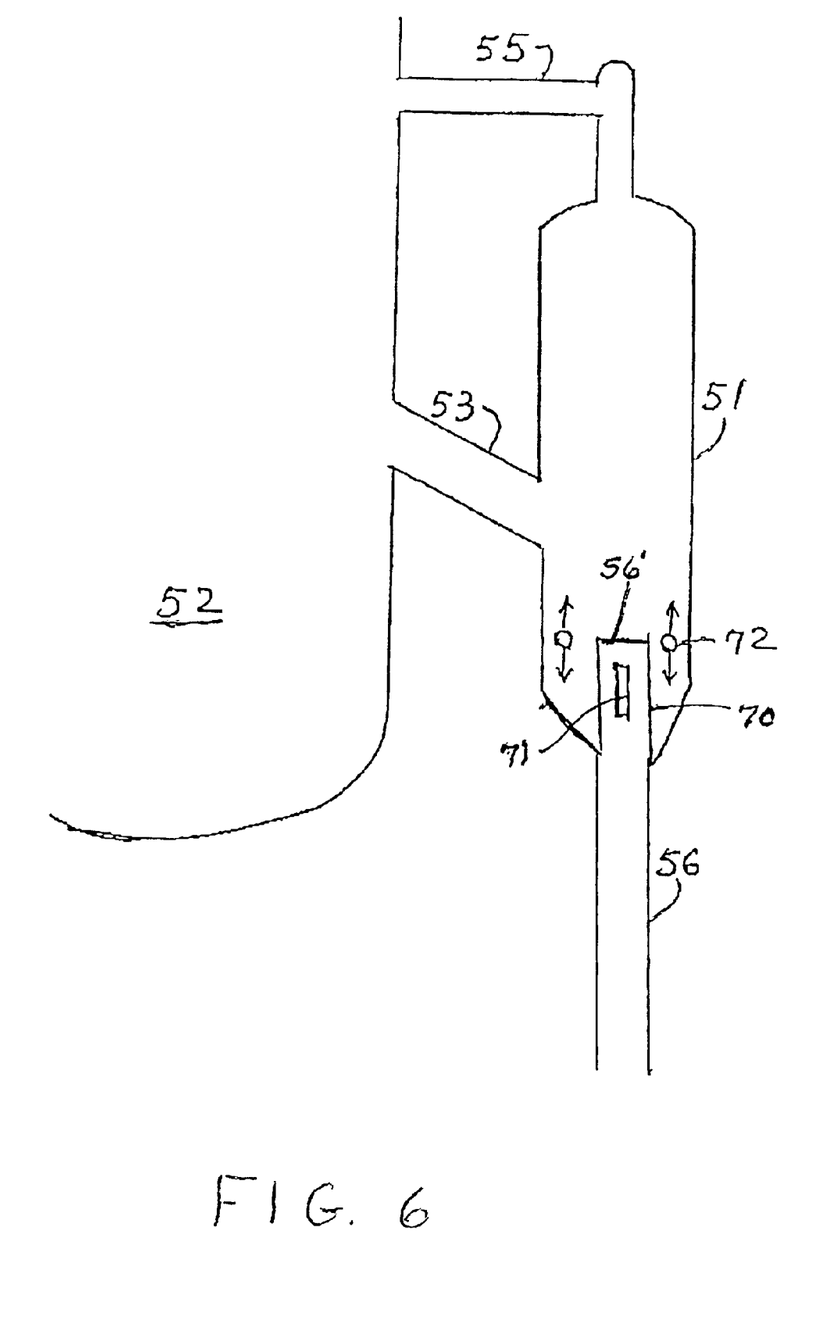
FIG. 6 shows the instant invention which comprises a modification of the standpipe inlet to the prior art configuration of FIG. 5.

FIG. 6 shows the regenerator withdrawal well 51 of FIG. 5 as modified by the instant invention. As shown in FIG. 6, the regenerator 52, the inclined standpipe 53, the vent line 55 connecting the regenerator 52 to the withdrawal well 51 and the regenerator standpipe 56 remain the same. The modifications provided by the instant invention include an extended standpipe section 70, which extends into the withdrawal well 51, and a new fluidization injection 72 located close to the upper end of the extended standpipe section70. The extended standpipe 70 has an open upper end 56' inside the withdrawal well, near the level of the fluidization injection 72, to allow fluidized catalyst to flow into standpipe 56. In addition, the extended standpipe 70 also includes a plurality of elongated slot openings 71, at a level near or below the fluidization injection 72, to provide additional passages for catalyst to flow into standpipe 56. The number of elongated slot openings could be in the range of one to twenty, but is preferably in the range of to to eight. The total flowing area of the elongated slot openings could be in the range of 20% to 800% of the area of standpipe inlet 56' opening, but is preferably in the range of 50% to 400%. The fluidization injection 72 may include one or a plurality of gas injection conduits which have a plurality of nozzles injecting fluidization gas both upward and downward. The upward fluidization velocity emitted from the fluidization injection 72, based on the cross-sectional area of the withdrawal well at its largest diameter, could be in the range of 0.05 to 4 feet/sec, but is preferably in the range of 0.2 to 2 feet/sec. The downward fluidization velocity emitted from the fluidization injection 72, based on the largest cross-sectional area of the withdrawal well, could be in the range of 0 to 2 feet/sec, but is preferably in the range of 0.02 to 1 feet/sec. The fluidization injection 72 of the instant invention is located at a higher elevation compared to the fluidization injection 54 in FIG. 5 of the prior art. The combination of the fluidization injection 72 and the extended standpipe section 70 having a plurality of elongated slots 71 reduces gas entrainment into the standpipe 56, thus allowing withdrawal well 51 to maintain a fluidized condition at all time. This assures smooth catalyst circulation.

Since installation of the modifications with the instant invention according to FIG. 6, Assignee's FCC unit has been running in a stable mode in the entire range of catalyst circulation rates, which is quite different from the previous operational experience with the prior art configuration of FIG. 5. There has been no instance of feed outage caused by standpipe instability since modification of the FCC with the instant invention. In addition, the highest catalyst circulation rate has been increased by 15%, compared to the prior art of FIG. 5. The unit also became less sensitive to the change of regenerator level, which allows the unit to operate in a wider range of conditions From the discussion above, it is demonstrated that the standpipe inlet design of the instant invention has several advantages over the inlet hopper design of the prior art when it is applied to the regenerator standpipe of a FCC unit:

More Stable Operation—The inlet design of the instant invention does not rely on the mechanism of the prior art inlet hopper to draw in lots of bubbles, letting them coalescence and grow into large bubbles. Instead, the new inlet design minimizes bubble entrainment by strategically eliminating bubbles around the standpipe inlet region with local de-fluidization. Since the new design does not require the formation and release of large bubbles in the hopper design, which leads to standpipe instability, the design of the instant invention is inherently more stable.

More effective in reducing gas entrainment—The concept of the prior art inlet hopper is to draw in lots of bubbles while trying to reduce gas entrainment. This is inherently a very inefficient design. On the other hand, the basic design of the instant invention is to strategically eliminate bubbles by local de-fluidization of the catalyst before it enters the standpipe. Thus, the design of the instant invention is inherently more efficient in reducing gas entrainment into the standpipe.

Better Control—The prior art hopper inlet has little control of gas entrainment around the inlet. As the catalyst circulation rate increases, more and more bubbles are drawn into the hopper, leading to higher and higher gas entrainment. The design of the instant invention, on the other hand, maintains complete control of the flow condition near the inlet by eliminating all bubbles, then introducing only a small amount of gas necessary for smooth operation.

Simplicity—The design of the instant invention is simpler and more robust than the prior art hopper design.

When the standpipe inlet design of the instant invention is applied to the stripper standpipe, it provides several additional advantages over the prior art inlet hopper design for enhancing stripper and regenerator performance of a FCC unit. This is in addition to the benefits already discussed for application in the regenerator standpipe where catalyst circulation and standpipe stability are the main concerns:

Higher stripping efficiency—The standpipe inlet design of the instant invention is shown to be more effective in reducing gas entrainment into the standpipe. Since the entrained gas from the stripper standpipe may contain about 40% by weight of hydrocarbon products, the standpipe inlet design of the instant invention effectively increases hydrocarbon products by reducing hydrocarbon loss to the gas entrainment.

Lower regenerator loading—Since the stripper standpipe inlet design of the instant invention is more effective in reducing gas entrainment, less hydrocarbon will enter the regenerator. This leads to lower air requirement and less heat to be removed as less hydrocarbon is to be burned in the regenerator. More importantly, many FCC units today are limited by air supply or heat removing capacity in the regenerator. Thus, the instant invention can be used to debottleneck the unit.

When the standpipe inlet design of the instant invention is applied to the withdrawal well of the prior art, it has been demonstrated that the modification has several advantages:

More Stable Operation—The inlet design of the instant invention eliminates the problems of local de-fluidization of the original withdrawal well of the prior art. This leads to a more stable catalyst flow at all conditions.

More flexibility—The standpipe operation is no longer sensitive to the regenerator bed level which gives more flexibility to operate the unit.

Higher catalyst circulation—The modification leads to 15% higher catalyst circulation.

Although the above discussion focuses on the applications of the instant invention in FCC units, a similar standpipe inlet design can also be applied to improve circulation of particulate solids and reduce gas entrainment in other petrochemical processes, such as fluid cokers and flexicokers, and processes other than petrochemical, such as circulating fluidized bed combustors, where large quantities of particulate solids are circulated between different vessels connected by standpipes and risers.

What is claimed is:

1. A catalytic cracking unit comprising:
   a regenerator;
   a catalyst withdrawal well spaced from said regenerator;
   a downwardly inclined standpipe having its upper end fluidly connected to said regenerator, and its lower end fluidly connected to said catalyst withdrawal well;
   a standpipe for receiving catalyst from said catalyst withdrawal well, said standpipe having an open end fluidly connected to said catalyst withdrawal well; and,
   an inlet portion of said standpipe extending into said catalyst withdrawal well for receiving and transporting said catalyst from said catalyst withdrawal well, said extended standpipe inlet portion including an open upper end and a plurality of openings cut through the wall of said extended standpipe below said open upper end and above the floor of said catalyst withdrawal well.

2. The apparatus of claim 1 wherein said plurality of openings are slots.

3. The apparatus of claim 1 further including means for injecting fluidizing gas above said floor of said catalyst withdrawal well for maintaining fluidization of said particulate solids in said catalyst withdrawal well.

4. The apparatus of claim 1 wherein said standpipe is fluidly connected to the bottom of a withdrawal well of a fluid catalytic cracking unit.

5. The apparatus of claim 1 wherein said standpipe is part of a regenerator of a fluid catalytic cracking unit.

6. The apparatus of claim 2 wherein said standpipe is fluidly connected to the bottom of a withdrawal well of a fluid catalytic cracking unit.

7. The apparatus of claim 2 wherein said standpipe is part of a regenerator of a fluid catalytic cracking unit.

8. The apparatus of claim 3 wherein said means for injecting fluidizing gas includes at least one gas injection ring.

9. The apparatus of claim 3 wherein said standpipe is fluidly connected to the bottom of a withdrawal well of a fluid catalytic cracking unit.

10. The apparatus of claim 3 wherein said standpipe is part of a regenerator of a fluid catalytic cracking unit.

11. The apparatus of claim 8 wherein said at least one gas injection ring is located at a level near said open upper end of said extended standpipe inlet.

12. The apparatus of claim 11 wherein said standpipe is fluidly connected to the bottom of a withdrawal well of a fluid catalytic cracking unit.

13. The apparatus of claim 11 wherein said standpipe is part of a regenerator of a fluid catalytic cracking unit.

14. A hydrocarbon process unit comprising:
    a main fluidized bed vessel with particulate solids;
    a withdrawal well spaced from said main fluidized bed vessel;
    a downwardly inclined standpipe having its upper end fluidly connected to said main fluidized bed vessel, and its lower end fluidly connected to said withdrawal well;
    a standpipe for receiving particulate solids from said withdrawal well, said standpipe having an open end fluidly connected to said withdrawal well; and, an inlet portion of said standpipe extending into said withdrawal well for receiving and transporting said particulate solids from said withdrawal well, said extended standpipe inlet portion including an open upper end and a plurality of openings cut through the wall of said extended standpipe below said open upper end and above the floor of said withdrawal well.

15. The apparatus of claim 14 wherein said plurality of openings are slots.

16. The apparatus of claim 14 further including means for injecting fluidizing gas above said floor of said withdrawal well for maintaining fluidization of said particulate solids in said withdrawal well.

17. The apparatus of claim 16 wherein said means for injecting fluidizing gas includes at least one gas injection ring.

18. The apparatus of claim 17 wherein said at least one gas injection is located at a level near said open upper end of said extended standpipe inlet.

* * * * *